United States Patent [19]

Linden et al.

[11] 4,226,637

[45] Oct. 7, 1980

[54] DISPERSING OF PIGMENTS

[75] Inventors: Heinrich Linden, Düsseldorf; Jochen Heidrich, Düsseldorf-Benrath; Bernd Wegemund, Haan; Hans Bornmann, Düsseldorf, all of Fed. Rep. of Germany

[73] Assignee: Henkel Kommanditgesellschaft auf Aktien, Düsseldorf-Holthausen, Fed. Rep. of Germany

[21] Appl. No.: 962,371

[22] Filed: Nov. 20, 1978

[30] Foreign Application Priority Data

Dec. 8, 1977 [DE] Fed. Rep. of Germany ....... 2754576

[51] Int. Cl.³ .................... C09C 1/24; C09C 1/36; C09C 3/08; C09D 3/00
[52] U.S. Cl. .................... 106/308 Q; 106/262; 106/300; 106/304; 260/13; 260/18 R; 568/678
[58] Field of Search .................... 106/304, 300, 308 Q; 568/678

[56] References Cited

U.S. PATENT DOCUMENTS

| | | | |
|---|---|---|---|
| 2,927,863 | 3/1960 | Marotta et al. | 106/308 Q |
| 3,240,819 | 3/1966 | Gaertner et al. | 568/623 |
| 3,242,200 | 3/1966 | Johnson | 260/398 |
| 3,451,835 | 6/1969 | Ganter et al. | 106/308 Q |
| 3,947,287 | 3/1976 | Belde et al. | 106/308 Q |
| 3,954,884 | 5/1976 | Kidwell | 568/678 |
| 4,019,923 | 4/1977 | Mahe | 106/308 Q |

*Primary Examiner*—Helen M. McCarthy
*Attorney, Agent, or Firm*—Hammond & Littell, Weissenberger & Muserlian

[57] ABSTRACT

Dispersion adjuvants are described comprising β-hydroxyalkyl esters of the formula

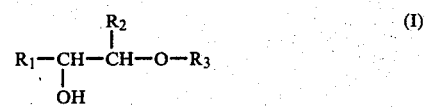

wherein the $R_1$ and $R_2$ represent hydrogen or alkyl with 1 to 21 carbon atoms, in which at least one of $R_1$ and $R_2$ is alkyl and the sum of the carbon atoms in $R_1$ and $R_2$ ranges from 6 to 22, and wherein $R_3$ represents alkyl with 1 to 8 carbon atoms, optionally substituted with 1 to 2 hydroxyl groups and/or interrupted by 1 to 2 ether bridges, as well as the adducts of compounds of Formula I with alkylene oxides, preferably ethylene oxide and/or propylene oxide. The dispersion adjuvants are coated on pigment and filler materials for paints and lacquers. The coating is applied before or during the dispersion of the materials in the paint or lacquer media or vehicle.

11 Claims, No Drawings

DISPERSING OF PIGMENTS

FIELD OF THE INVENTION

This invention relates to pigment and filler dispersing agents and more specifically to such dispersants based upon β-hydroxylalkyl ethers.

BACKGROUND OF THE INVENTION

In the preparation of pigmented paints and coatings, the pigments and fillers must be dispersed in organic or aqueous media. The agglomerates of the primary pigment granule have to be broken down before the pigments can be properly dispersed. The organic pigment and filler materials are then mechanically dispersed by means such as kneaders, or mills such as a rolling mill or ball mill. Because of the expenditures of time and energy involved, dispersing represents a considerable cost factor. In order to cut time costs for this unit operation, the pigments and fillers are pre-treated with organic dispersant adjutavant compounds to lower the surface tension between the solid particles and the organic or aqueous medium and thereby to ease dispersion. The action of the organic compound should be limited, as much as possible, to improving the dispersion without negative side effects on the ultimate product, the paint or the lacquer. U.S. Pat. No. 1,722,177 teaches treating inorganic pigments and fillers with stearic acid or resin acids and their alkali or ammonium soaps in order to improve their dispersibility. French Pat. No. 1,276,739 teaches the use of triethanolamine and its salts for the same purpose. Aliphatic amines have also been proposed as means for the improvement of the dispersibility of inorganic pigments and fillers.

U.S. Pat. No. 3,928,276 teaches the use of salts of tertiary and/or quaternary aminealkylene oxide- adducts of mono or dimeric fatty acids.

In the selection of such dispersing adjuvants, it must be considered that many of these additives are products alien to the paint and lacquer media which may, aside from the desired dispersing effect, have also undesirable properties upon water solubility and emulsifying power. Many of these products may cause disturbing side effects such as the loss of gloss of the final coating or the delay of drying during the formation of the films.

OBJECTS OF THE INVENTION

An object of the present invention is the development of a dispersant for pigments and fillers which readily disperses the same in organic media without effecting the final properties of the paint or lacquer.

Another object of the present invention is the development of a process for improving the dispersibility of paint and lacquer pigment and filler particles in paint and lacquer vehicles which comprises the steps of coating said particles with dispersion-improving amounts of at least one dispersant selected from the group consisting of a β-hydroxyalkyl ether of the formula

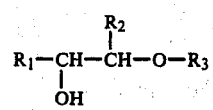

where $R_1$ and $R_2$ are members selected from the group consisting of hydrogen and alkyl of 1 to 21 carbons, with the proviso that at least one of $R_1$ and $R_2$ is alkyl and the sum of the carbons in $R_1$ and $R_2$ is from 6 to 22; $R_3$ is a member selected from the group consisting of alkyl having from 1 to 8 carbon atoms; hydroxyalkyl having from 2 to 8 carbon atoms, dihydroxyalkyl having from 3 to 8 carbon atoms, alkoxyalkyl having from 3 to 8 carbon atoms, hydroxyalkoxyalkyl having from 4 to 8 carbon atoms and hydroxyalkoxyalkyl having from 6 to 8 carbom atoms; and the alkylene oxide adducts selected from the group consisting of ethylene oxide and propylene oxide of said β-hydroxyalkyl ether and then dispersing said coated particles in said vehicle.

A yet further object of the present invention is the obtaining of coated pigment and filler particles for paints and lacquers comprising particles of pigment and filler coated with 0.05% to 5% by weight of a dispersant selected from the group consisting of a β-hydroxyalkyl ether of the formula

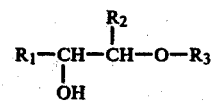

where $R_1$ and $R_2$ are members selected from the group consisiting of hydrogen and alkyl of 1 to 21 carbons, with the proviso that at least one of $R_1$ and $R_2$ is alkyl and the sum of the carbons in $R_1$ $R_2$ is from 6 to 22; $R_3$ is a member selected from the group consisting of alkyl having from 1 to 8 carbon atoms, hydroxyalkyl having from 2 to 8 carbon atoms, dihydroxyalkyl having from 3 to 8 carbon atoms, alkoxyalkyl having from 3 to 8 carbon atoms, hydroxyalkoxyalkyl having from 4 to 8 carbon atoms, hydroxyalkoxyalkoxyalkyl having from 6 to 8 carbon atoms; and the alkylene oxide adducts selected from the group consisting of ethylene oxide and propylene oxide of said β-hydroxyalkyl ether.

These and other objects of the invention will become apparent as the description thereof proceeds.

DESCRIPTION OF THE INVENTION

This invention is based on the discovery that β-hydroxyalkyl ethers of the formula

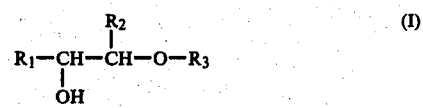

where the radicals $R_1$ and $R_2$ represent hydrogen or alkyl radicals containing 1 to 21 carbon atoms and at least one of $R_1$ and $R_2$ is an alkyl radical and the sum of the carbon atoms in $R_1$ and $R_2$ amounts to 6 to 22; $R_3$ a straight or branched chain alkyl radical with 1 to 8 carbon atoms, which may be substituted with 1 to 2 hydroxyl groups and/or interrupted by 1 to 2 ether bridges, as well as the reaction products (adducts) of the compounds of Formula I with alkylene oxides, especially with ethylene oxide and/or propylene oxide, may be advantageously used to treat inorganic and organic pigments and fillers in order to improve their dispersibility in organic and aqueous media for preparing paints and lacquers.

More particularly, the present invention relates to a process for improving the dispersibility of paint and lacquer pigment and filler particles in paint and lacquer vehicles which comprises the steps of coating said particles with dispersionimproving amounts of at least one dispersant selected from the group consisting of a β-hydroxyalkyl ether of the formula

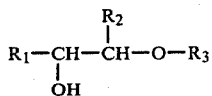

where $R_1$ and $R_2$ are members selected from the group consisting of hydrogen and alkyl of 1 to 21 carbons, with the proviso that at least one of $R_1$ and $R_2$ is alkyl and the sum of the carbons in $R_1$ and $R_2$ is from 6 to 22; $R_3$ is a member selected from the group consisting of alkyl having from 1 to 8 carbon atoms, hydroxyalkyl having from 2 to 8 carbon atoms, dihydroxyalkyl having from 3 to 8 carbon atoms, alkoxyalkyl having from 3 to 8 carbon atoms, hydroxyalkoxyalkyl having from 4 to 8 carbon atoms and hydroxyalkoxyalkoxyalkyl having from 6 to 8 carbon atoms; and the alkylene oxide adducts selected from the group consisting of ethylene oxide and propylene oxide of said β-hydroxyalkyl ether and then dispersing said coated particles in sid vehicle; as well as coated filler and pigment particles for paints and lacquers comprising particles of pigment and filler coated with 0.05% to 5% by weight of a dispersant selected from the group consisting of β-hydroxyalkyl ether of the formula

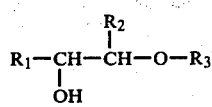

where $R_1$ and $R_2$ are members selected from the group consisting of hydrogen and alkyl of 1 to 21 carbons, with the proviso that at least one of $R_1$ and $R_2$ is alkyl and the sum of the carbons in $R_1$ and $R_2$ is from 6 to 22; $R_3$ is a member selected from the group consisting of alkyl having from 1 to 8 carbon atoms, hydroxyalkyl having from 2 to 8 atoms, dihydroxyalkyl having from 3 to 8 carbon atoms, alkoxyalkyl having from 3 to 8 carbon atoms, hydroxyalkoxyalkyl having from 4 to 8 carbon atoms; hydroxyalkoxyalkoxyalkyl having from 6 to 8 carbom atoms and the alkylene oxide adducts selected from the group consisting of ethylene oxide and propylene oxide of said β-hydroxyalkyl ether.

The β-hydroxyalkyl ethers for use according to this invention are synthesized from mono-olefins of 8 to 24 carbon atoms having a terminal double bond or a randomly distributed interior double bond. Mainly considered among olefins with interior double bonds are mixtures of such compounds of differential chain length.

Olefins with terminal double bonds can be obtained in good yields by cracking paraffinic hydrocarbons by usual processes or by aluminochemical cataclytic methods. Olefins or olefin mixtures with interior double bonds are obtainable by way of catalytic dehydrogenation, or chlorination/dehydrochlorination of linear paraffins of the aforesaid chain length range and the subsequent selective recovery of the mono-olefins with interior double bonds.

For the preparation of the β-hydroxyalkyl ethers of Formula I, the olefins are first epoxidized by conventional methods, for instance, with peracetic acid. To obtain the β-hydroxyalkyl ethers of Formula I, the epoxy alkanes of formula

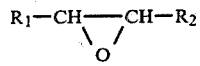

are reacted with alcohols of formula $$R_3—OH \qquad (III)$$

at elevated temperature and suitably in the presence of acid or alkaline catalysts.

The ethers may have OH numbers in the range 100–500.

Among alcohols of the formula $R_3OH$ are methanol, ethanol, isopropanol, hexanol, 2-ethylhexanol, ethylene glycol, propanediol-(1,2); propanediol-(1,3); butanediol-(1,3); hexanediol-(1,6); glycerol, trimethylol propane, ehtylene glycol monomethyl ether, diethylene glycol, and triethylene glycol. For reaction with the epoxy alkanes of Formula II, these alcohols are used in amounts of at least one mol of alchol per mol of the epoxide. In many cases, it has proved advantageous to work with an excess of alcohol of 1 to 20 times, preferably, 1 to 8 times.

Suitable catalysts for the reaction between the epoxide and alcohol are borofluoride etherate and borofluoride acetate, but mineral acids like sulfuric acid, as well as the hydroxides and alcoholates of the alkali metals, especially of sodium, are also useful. The catalysts are added to the reaction mixture in amounts of from about 0.01 to about 5 percent by weight based on the epoxyalkane to be reacted.

The epoxyalkanes are usually reacted with the alcohols at reflux temperature and under normal pressure. However, in reactions involving low boiling alcohols, especially with methanol, it may be advantageous to perform there reaction in an autoclave at 100° to 180° C. at autogenous pressures.

The excess alcohol is distilled from the resulting reaction mixture. The remaining products can be used in the process aspects of the invention without further purification.

The reaction products of the compounds of Formula I with ethylene oxides for use accoording to this invention are produced by the addition of the alkylene oxides in the presence of alkyaline catalysts. This refers mainly to the addition of ethylene oxide and/or 1, 2-propylene oxide, however, mainly of ethylene oxide.

The degree of oxalkylation may vary within wide ranges. In the case of ethylene oxide it may range from 2 to 30, preferably, 5 to18 mols of ethylene oxide per mol of β-hydroxyalkyl ether.

While it is possible to alkoyxlate a secondary hydroxyl group in the middle of a long chain, it is preferable to alkoxylate a terminal primary hydroxyl group. Therefore, adducts of the β-hydroxyalkyl ethers of Formula I wherein $R_3$ is hydroxyalkyl, hydroxyalkoxyalkyl or hydroxyalkoxyalkoxyalkyl, are ordinarily employed.

In the treatment according to this invention of the inorganic or organic pigments or fillers to improve their dispersiblity in organic or aqueous media, the β-hydroxyalkyl ethers of Formula I or their adducts with alkylene oxides are added to the pigments or fillers in amounts of 0.05 to 5 percent by weight, preferably, 0.1 to 1 percent by weight, based on the pigment or filler to be coated.

Most inorganic pigments and fillers are suitable substrates for the coating process of this invention. Especially good results were obtained in the treatment according to the invention of titanium oxide pigments and iron oxide pigments. The coating of the pigments or fillers with the β-hydroxyalkyl ethers and their alkoxyl adducts according to this invention may take place as a separate step or during pigments production, for instance, during the milling by means of ball mills, panned disk mills, or stem jet mills, in the liquid-pigment suspension, or by treatment of the moist filter cake, as well as applying the coating on the finished pigment or filler. There also is no interference when applying the coating aftr the substrates have already gone through an inorganic pre-treatment. For instance, titanium dioxide pigments onto which aluminum oxide and/or silicon dioxide has been precipitated may, without trouble, be subsequently treated with the products of Formula I, according to the invention. The β-hydroxyalkyl ethers of Formula I or their oxalkylation products are used, in the application, according to the invention, directly as such, from aqueous suspension, if necessary, in combination with suitable surface-active agent, or from solution in organic solvents. If surface-active agents are added in the preparation of aqueous suspension, care should be taken that the surface-active agents have no undesired effects on the properties of the paint or lacquer coatings in which the pigments and fillers are to be used.

If the compounds to be used according to the invention are applied in the form of suspension or solutions, in most cases it is preferable to distill off the water or solvent after intimate mixing to coat the substrate.

The following Examples, while including the best mode now contemplated for the practice of this invention, are also illustrative thereof without being limitative in any manner thereof. All art-recognized equivalent materials and processes are intended.

EXAMPLES

I. Preparation of the β-hydroxyalkyl ethers to be used according to the invention.

Substance A 1 gm of sodium was dissolved in 320 gm (10 mols) of methanol. After the additiion of 132 gm (1 mol) of technical 1,2-epoxy octane (15.2% by weight epoxide oxygen), the mixture was heated in an autoclave to 140° to 180° C. for 4 hours. The excess methanol was then removed by distillation. The residue was washed with water and dried. A water-clear liquid with the OH number of 320 was obtained.

Substance B 64.2 gm (0.3 mol) of an 1,2-epoxyalkane mixture of chain length $C_{12}$–$C_{14}$ (7.47% by weight epoxide oxygen), 30.6 gm (0.3 mol) of n-hexanol and 0.3 gm of borofluoride acetate as catalyst were heated 120° to 150° C. for 6 hours. The yellow liquid reaction product had an OH number of 182; its epoxide content was less than 0.1% by weight.

Substance C 64.2 gm (0.3 mol) of an 1,2-epoxyalkane mixture of the chain length $C_{12}$–$C_{14}$ (7.47% by weight epoxide oxygen) was added to 195 gm (1.5 mol) of 2-ethylhexanol and 0.3 gm of borofluoride acetate and heated to 120° to 130° C. for 6 hours. Subsequently, the excess 2-ethylhexanol was removed by distillation at 12 torr. 93.1 gm of a light-colored oil of OH number 172 remained as residue.

Substance D 2130 gm (10 mols) of an epoxyalkane mixture of the chain length $C_{11}$–$C_{14}$ with interior epoxide groups statistically distributed along the carbon chain (7.5% by weight epoxide oxygen) were heated with 3100 gm (50 mols) of ethylene glycol and 10 gm of borofluoride acetate at 120° to 130° C. for 6 hours. After removal of the excess ethylene glycol by distillation at 12 torr., a water-clear liquid remained, having the OH number 410.

Substance E 285 gm (1 mol) of an 1,2-epoxyalkane mixture with the chain length $C_{16}$–$C_{18}$ (5.6% by weight epoxide oxygen), 310 gm (5 mols) of ethylene glycol and 1 gm of borofluoride acetate were heated at 120° to 130° C. for 6 hours. Excess ethylene glycol was distilled off at a water aspirator vacuum. The reaction product with OH number 292 remained.

Substance F 107 gm (0.5 mol) of an 1,2-epoxyalkane mixture of chain length $C_{12}$–$C_{14}$ (7.47% by weight epoxide oxygen), 225 gm (2.5 mol) of butanediol-(1,3) and 0.2 gm of borofluoride acetate were heated for 6 hours at 120° to 130° C. A product of OH number 375 remained after the distillation removal of the excess diol.

Substance G 85.2 gm (0.4 mol) of an epoxyalkane mixture of the chain length $C_{11}$–$C_{14}$ with interior, statistically distributed, epoxide groups (7.5% by weight epoxide oxygen), 286 gm (2 mols) of hexanediol-(1,6) and 0.2 gm of borotrifluoride etherate were heated at 120° to 130° C. for 6 hours. Subsequently, the excess hexanediol was removed by distillation at 12 torr. A liquid product of OH number 343 remained.

Substance H 285 gm (1 mol) of an 1,2-epoxyalkane mixture of the chain length $C_{16}$–$C_{18}$ (5.6% by weight epoxide oxygen), 402 gm (3 mols) of trimethylol propane, and 1 gm of sodium methylate were heated to 180° to 200° C. for 4 hours. Subsequently, the excess trimethylol propane was distilled off at 1 torr. The residue was a pale, yellow, soft resin with OH number 379.

Substance I 281 gm (1 mol) of an epoxyalkane mixture of the chain length $C_{15}$–$C_{18}$ with interior epoxide groups statistically distributed along the carbon chain (5.69% by weight epoxide oxygen), 530 gm (5 mols) of diethylene glycol and 1 ml of borofluoride dietherate were warmed with stirring to 80° C. for 3 hours. The excess diethylene glycol was subsequently distilled off under reduced pressure. The residue was 334 gm of a pale, yellow liquid of OH number 303.

Substance J 822 gm (3 mols) of substance D (OH# 410; molecular weight 274) and 0.1 gm of sodium methylate (25% by weight solution in methanol) were introduced into a 3 liter V4 steel autoclave equipped with stirrer. The autoclave was closed, flushed with nitrogen, and warmed to 70° C. At this constantly maintained temperature, 1,320 gm (30 mols) of ethylene oxide were pumped in. Subsequently, the temperature was maintained at 140° to 180° C. for 1 hour. After cooling, a clear water-white liquid of OH number 155 was obtained. A 1% by weight solution of this ethylene oxide adduct in a 5% by weight sodium chloride solution had a turbidity point of 64° C.

Substance K 548 gm (2 mols) of substance D (OH# 410; molecular weight 274) were reacted with 1,320 gm (30 mols) of ethylene oxide in the presence of 0.1 gm of sodium ethylate as described for substance J. The product of OH number 128 was obtained.

II. Testing effectiveness of the β-hydroxyalkyl ethers as dispersant agents according to the invention.

Test A

A titanium dioxide, prepared by the sulfate process and treated by precipitation of aluminum oxide on its surface ("Bayertitan R-U-2") was used as the pigment to be coated. The substances A to I of Example I were used as a further coating. The coating was achieved with solutions which contained 0.2 to 0.7 gm of the β-hydroxyalkyl ether in a mixture of 180 gm of petroleum ether (boiling range of 60° to 90° C.) and 20 gm of ethanol. Each of these solutions was intensely stirred with 100 gm of the titanium dioxide 30 minutes. Subsequently, the solvent mixture was distilled off by water-aspirator vacuum. After completion of the distillation the pigment was heated to about 80° C. The thus coated pigments, coated with 0.2 to 0.7% by weight of β-hydroxyalkyl ether were tested in comparison to uncoated pigment as follows:

As blank test;
18.0 gm of the titanium dioxide without the organic coating;
24.0 gm of air-drying alkyd resin with 48% by weight oil, 55% by weight in solution of xylene/test benzine;
10.0 gm of test benzine;
1.4 gm of xylene; were introduced in a 250 ml wide-neck flask which had been charged with 75 gm of glass beads of 3 mm diameter and were shaken for 60 minutes in a mechanical shaker (Red Devil "Paint Conditioner 5100"). Subsequently, this mixture was stirred with the following:
72.0 gm of alkyd resins (as above);
2.0 gm of test benzine;
1.4 gm of xylene;
1.0 gm of silicone oil (1% by weight in xylene, Wacker-Chemie type "AK 35");
1.46 gm of lead octoate (24% by weight Pb);
0.46 gm of cobalt octoate (6% by weight Co);
0.28 gm of manganese octoate (6% by weight Mn);
1.4 gm of methyl ethyl ketoxime (55% in test benzine)
80.0 gm.
The resulting lacquer was treated with 14.2 gm of the following dispersed black paste and homogenized:
18 gm of carbon black (Degussa "Flame Soot 101");
180 gm of alkyd resin (as above);
60 gm of test benzine;
26 gm of xylene.

The tinted lacquers were spread on glass plates by a doctor blade set at 100 μm. After drying the reflectance value was determined at 420 nm by colorimeter (Carl Zeiss PM W II). The testing of the samples of pigment coated with the substances A to I was performed in a similar manner to that of the blank test. Instead of 18 gm of titanium dioxide, in each case (18.00 +0.18A) gm of Al₂O₃ coated titanium dioxide was used, where A represents the percentage of the coating medium, based on the pigment, given in column 2 of Table I. The reflectance values are set forth in Table I. A higher reflectance value is equivalent to a greater brightening power, resulting from better dispersion of the white pigment.

TABLE I

| | Reflectance values of the lacquer samples at 420 nm | |
|---|---|---|
| Substance | Wt. % of (vehicle) | Reflectance |
| BLANK | — | 29.2 |
| A | 0.7 | 31.2 |
| B | 0.6 | 30.9 |
| C | 0.5 | 30.9 |
| D | 0.5 | 30.3 |
| E | 0.5 | 31.2 |
| F | 0.7 | 30.7 |
| G | 0.6 | 31.3 |
| H | 0.5 | 30.9 |
| I | 0.2 | 29.6 |
| I | 0.4 | 30.1 |

Test B

For a comparison of the drying properties, titanium dioxide was coated as described in Test A with 1% by weight of each of the following products:
(a) substance A
(b) triethanolamine (comparison substance)
(c) N-soybean fatty alkyl-propylenediamine-(1,3) (comparison substance)

The coated pigments were incorporated into an air drying lacquer of the following composition:
580 gm of alkyd resin with a content of 65% by weight cottonseed oil:
  60% by weight solution in test benzine (Synthalat CF 61 from Synthopol Chemie, Buxtehude, Germany)
116 gm of test benzine;
290 gm of titanium dioxide (uncoated; or coated with (a), (b) or (c);
  4 gm of calcium napthenate (4% by weight, Ca);
  4 gm of cobalt naphthenate (4% by weight Co);
  4 gm of lead naphthenate (4% by weight Pb);
  2 gm of methylethyl ketoxime.
The test for drying properties was performed on a drying time measuring instrument (Erichsen, Hemer-Sundwig, Germany, type 338) which works according to the following principle:

The coatings to be tested are applied by means of a film coater (aperture width 200 μm) under identical conditions to glass plates (350×25×10 mm). The glass plates are inserted into the device side by side. A ball point stylus is placed on each sample, guided at constant pressure and at constant speed over a distance of 24 cm in the course of 24 hours. The characteristic trace each ball point stylus leaves on the coating film is evaluated as a measure of the drying process. The length traveled from the initial set-down of the stylus to the beginning of a visible trace represents the time for initiation of surface drying. The length traveled from the initial set-down of the stylus to the first tearing of the film corresponds to the time necessary to reach a state of "dust dryness". The length traveled from the set-down of the stylus to the end of the trace, i.e., to the spot where the film is no longer torn, finally represents the time for complete drying. In all measurements, 1 cm of trace represents one hour. The results of the comparison test are reproduced in Table 2.

TABLE II

| | The Lacquer Drying Time | | |
|---|---|---|---|
| TiO₂ coated with: | Initiation of Drying | "dust dry" | Completely Dry |
| Substance A (a) | 1.0 h | 2.7 h | 12.0 h |
| Triethanolamine (b) | 1.8 h | 5.4 h | 19.0 h |
| N-soybean fatty alkyl- | | | |

TABLE II-continued

| | The Lacquer Drying Time | | |
|---|---|---|---|
| TiO$_2$ coated with: | Initiation of Drying | "dust dry" | Completely Dry |
| propylenediamine-(1,3) (c) | 1.3 h | 3.8 h | 12.2 h |
| Blank without coating | 1.0 h | 2.8 h | 12.4 h |

According to these results, the drying of the lacquer film is substantially not retarded by substance A (according to this invention). With triethanolamine, the dust-dry and completely dry state is considerably delayed. N-soybean fatty alkyl-propylenediamine-(1,3) considerably delays the dust-dry state.

Test C

A commercial iron oxide black ("Bayer" type 306 F) was used as the pigment to be coated. The coating was prepared as described in Test A using a 1% by weight solution of substance J. The test of the dispersibility of the coated pigment was performed as follows:

(a) Preparation of the black paste 100 gm of a 1% by a weight aqueous solution of hydroxy-ethyl cellulose (Hercules "Natrasol 250") were weighed into a 250 ml beaker (diameter 6 cm; height; 11 cm) and then 60 gm of coated or uncoated pigment were hand-stirred into the solution by a glass rod. The dispersion was achieved by a mechanical stirrer having a 4 cm diameter perforated disk. This disk was immersed centrally into the pigment paste to a distance of 1 cm from the bottom of the beaker and then, the sample was stirred for 5 minutes at 1,200 RPM.

(b) Preparation of a dispersion paint 45 gm of water;
45 gm of methyl hydroxypropyl cellulose, 2% by weight solution in water ("Culminal" PK 82, Henkel);
8 gm of sodium hexametaphosphate as a 10% by weight solution in water;
140 gm of titanium dioxide (type RN 56, Kronos Titangesellschaft, Leverkusen, Germany);
12 gm of calcite (type BLP 2, Omya, Cologne, Germany);
18 gm of microtalc (type AT, extra, Norwegian Talc);
320 gm of barium sulfate (type EOW 423 normal, R. Alberti, Bad Lauterberg, Germany);
1 gm of preservative ("Dehygant B" Henkel);
12 gm of ethyl glycol acetate;
were dispersed by stirring 20 minutes at about 5,000 RPM in a high speed stirrer. Subsequently, 350 gm of an aqueous synthetic resin dispersion (53% by weight dispersion of a vinyl acetate copolymer; Hoechst, "Mowolith DM 5"), and 45 gm of methyl hydroxypropyl cellulose solution (as above) were added with stirring.

(c) Toning:

100 gm of the dispersion paint (b) and 10 gm of black paste (a) were intimately mixed by stirring with a glass rod by hand in a 250 ml plastic beaker. The mixed paint was cast on a glass plate by a drawing box of 150 μm aperture height and 6 cm width. After the drying of the films, their reflectance was determined by a colorimeter PMQ II (C. Zeiss) at 420 nm. The reflectance values so obtained are listed below. A lower reflectance is here equivalent to a greater coloring ability of the black paste.

The following remission values were obtained:
coated iron oxide black: 30.2
uncoated iron oxide black: 31.1

Similarly, the dispersibility of blue-tinted, iron oxide red pigment ("Bayer" type 120 F), coated with 1% by weight of substance K was tested and the following values were found:
coated iron oxide red: 22.1
uncoated iron oxide red: 23.1

Although the present invention has been disclosed in connection with a few preferred embodiments thereof, variations and modifications may be resorted to by those skilled in the art without departing from the principles of this invention. All of these variations and modifications are considered to be within the spirit and scope of the present invention as disclosed in the foregoing description and defined by the appended claims.

We claim:

1. A process for improving the dispersibility of paint and lacquer pigment and filler particles in paint and lacquer vehicles which consists essentially of the steps of coating said particles with from 0.05% to 5% of at least one dispersant selected from the group consisting of a β-hydroxyalkyl ether of the formula

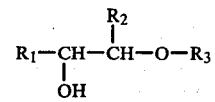

where R$_1$ and R$_2$ are members selected from the group consisting of hydrogen and alkyl of 1 to 21 carbons, with the proviso that at least one of R$_1$ and R$_2$ is alkyl and the sum of the carbons in R$_1$ and R$_2$ is from 6 to 22; and R$_3$ is a member selected from the group consisting of alkyl having from 1 to 8 carbon atoms, hydroxyalkyl having from 2 to 8 carbon atoms, dihydroxyalkyl having from 3 to 8 carbon atoms; alkoxyalkyl having from 3 to 8 carbon atoms, hydroxyalkoxyalkyl having from 4 to 8 carbon atoms and hydroxyalkoxyalkoxyalkyl having from 6 to 8 carbon atoms, and the alkylene oxide adducts selected from the group consisting of ethylene oxide and propylene oxide of said β-hydroxyalkyl ether, and then dispersing said coated particles in said vehicle.

2. The process according to claim 1 wherein said ether has an hydroxyl number in the range of 100 to 500.

3. The process according to claim 1 wherein a β-hydroxyalkyl ether adduct is employed and said adduct is selected from the ethylene and propylene oxide oxyalkylation adducts containing from 2 to 30 oxide mols per mol of said ether.

4. The process according to claim 3 wherein said adduct contains from 5 to 18 mols of ethylene oxide per mol of said ether.

5. The process for preparing the coated particles according to claim 1 which comprises contacting said particles to be coated with a liquid medium selected from aqueous suspensions or organic solutions of said dispersant and then removing the water or solvent forming said solution and leaving a coated dispersant residue on said particles.

6. The process according to claim 5 wherein said particles are coated with 0.1% to 1% by weight of said dispersant residue.

7. A paint containing coated particles prepared according to the process of claim 1 wherein said particles of pigment and/or filler are dispersed in said paint vehicle by agitation after being coated with the dispersion adjuvant consisting of said β-hydroxyalkyl ether and its adduct.

8. A lacquer containing coated particles prepared according to the process of claim 1 wherein said particles of pigment and/or filler are dispersed in said lacquer vehicle by agitation after being coated with the dispersion-adjuvant consisting of said β-hydroxyalkyl ether and its adducts.

9. The lacquer prepared according to the process of claim 1.

10. Coated filler and pigment particles for paints and lacquers consisting essentially of particles of pigment and filler coated with 0.05% to 5% by weight of a dispersant selected from the group consisting of a β-hydroxyalkyl ether of the formula

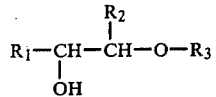

where $R_1$ and $R_2$ are members selected from the group consisting of hydrogen and alkyl of 1 to 21 carbons, with the proviso that at least one of $R_1$ and $R_2$ is alkyl and the sum of the carbons in $R_1$ and $R_2$ is from 6 to 22; and $R_3$ is a member selected from the group consisting of alkyl having from 1 to 8 carbon atoms, hydroxyalkyl having from 2 to 8 carbon atoms, dihydroxyalkyl having from 3 to 8 carbon atoms, alkoxyalkyl having from 3 to 8 carbon atoms, hydroxyalkoxyalkyl having from 4 to 8 carbon atoms, and hydroxyalkoxyalkoxyalkyl having from 6 to 8 carbon atoms, and the alkylene oxide adducts selected from the group consisting of ethylene oxide and propylene oxide of said β-hydroxyalkyl ether.

11. The coated filler and pigment particles of claim 10 coated with from 0.1% to 1% by weight of said dispersant.